(12) United States Patent
Christophe et al.

(10) Patent No.: US 8,204,636 B2
(45) Date of Patent: Jun. 19, 2012

(54) DEVICE FOR REST MANAGEMENT FOR AIRCRAFT PILOT

(75) Inventors: Laure Christophe, Colomiers (FR); Garance Pin, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 890 days.

(21) Appl. No.: 12/257,513

(22) Filed: Oct. 24, 2008

(65) Prior Publication Data

US 2010/0030406 A1 Feb. 4, 2010

(30) Foreign Application Priority Data

Oct. 31, 2007 (FR) ................................. 07 58712

(51) Int. Cl.
*G06F 7/70* (2006.01)
*G06F 19/00* (2006.01)
*G06G 7/00* (2006.01)
*G06G 7/76* (2006.01)
*G08B 23/00* (2006.01)

(52) U.S. Cl. ....................................................... 701/14
(58) Field of Classification Search .................... 701/14; 340/576; 244/118.6
See application file for complete search history.

(56) References Cited

U.S. PATENT DOCUMENTS

| 5,445,021 | A | * | 8/1995 | Cattoen et al. | 73/178 R |
| 2005/0190065 | A1 | * | 9/2005 | Ronnholm | 340/575 |
| 2009/0058624 | A1 | * | 3/2009 | Kane et al. | 340/439 |
| 2009/0273487 | A1 | * | 11/2009 | Ferro et al. | 340/963 |

OTHER PUBLICATIONS

French Search Report dated May 27, 2008.

* cited by examiner

*Primary Examiner* — John Nguyen
*Assistant Examiner* — Michael Whalen
(74) *Attorney, Agent, or Firm* — Perman & Green, LLP

(57) ABSTRACT

A device for managing a rest period, in flight, of a pilot in a cockpit of an airplane including parameter acquisition means, for acquiring one input parameter characteristic of a desired rest period by the pilot who wishes to have a rest, calculations means intended for calculating, from the current position of the airplane given by the airplane parameters, a future position of the airplane at the end of the desired rest period along a trajectory programmed from the input parameters and airplane parameters, means for displaying information on the rest period and or on the position of the airplane.

9 Claims, 3 Drawing Sheets

Fig. 2

ACTIVE/F-PLN/LL XING-TIME MKR

LAT/LOG CROSSING

START WPT: P.POS ▶  ○ LAT  ○ LONG

INCREMENT: 1  NUMBER: 1  INSERT AS WPT*

TIME MARKER

UTC 12:30:00  REMAINING TIME 00:19:30  AURAL ALERT  NAP ALERT CAPT  F/O

○  ●  ○
○  ○  ○

RETURN

Fig. 3

ACTIVE/F-PLN/LL XING-TIME MKR

LAT/LOG CROSSING

START WPT: P.POS ▶  ○ LAT  ○ LONG

INCREMENT: 1  NUMBER: 1  INSERT AS WPT*

TIME MARKER

UTC 12:30:00  REMAINING TIME 00:19:30  AURAL ALERT ☐

NAP MARKER

UTC 12:30:00  REMAINING TIME 00:19:30  ☐  START

RETURN

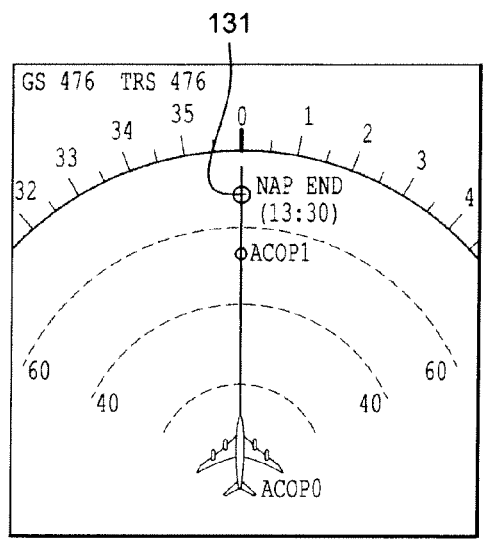 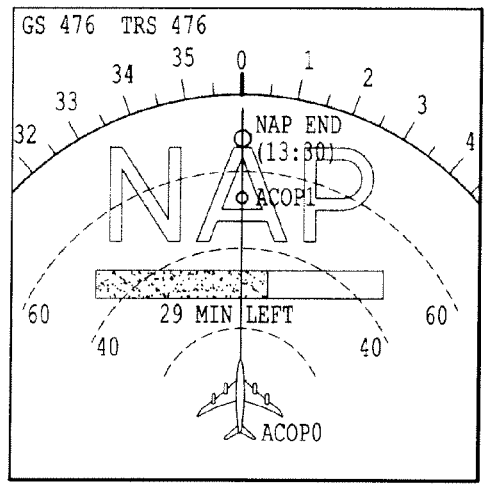
Fig. 4  Fig. 5
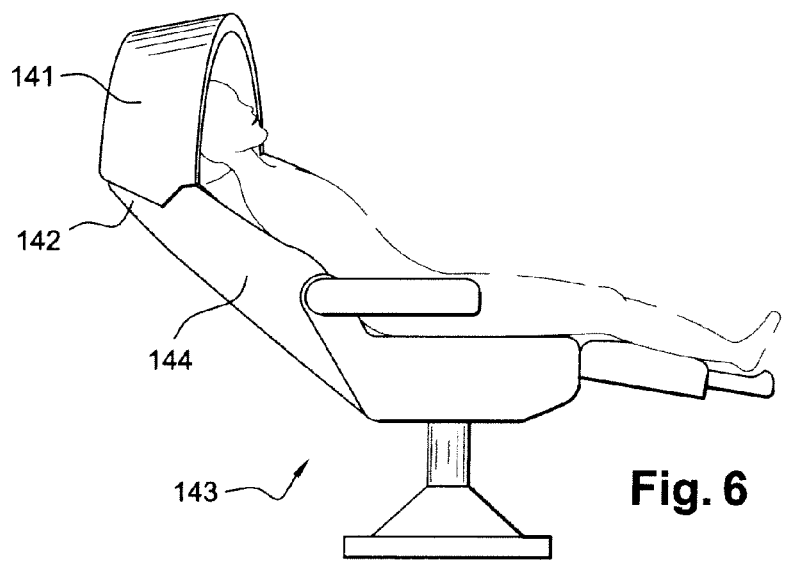
Fig. 6

DEVICE FOR REST MANAGEMENT FOR AIRCRAFT PILOT

BACKGROUND

1. Field

The disclosed embodiments are related to the field of airplane flying. More particularly, the disclosed embodiments relate to a device making it possible to manage the rest period of a pilot, so as to improve the quality of his or her rest period and his or her aptitude to an increased vigilance during the active phases of the flight.

2. Brief Description of Related Developments

Aboard airplanes, and more particularly civil air transport short, medium or long-haul planes, crews are composed of at least two pilots: one captain and one co-pilot. Aboard an airplane, the captain is always responsible for the flight and for the airplane and consequently he or she is the only one authorised to make certain decisions.

Generally, the captain, for fear that the co-pilot might fall asleep or would not wake him/her up, cannot rest even in case of serious fatigue.

During flights, and more particularly during medium or long-haul flights, the captain accumulates an important lack of sleep and the level of his or her fatigue may be very high, in particular because of work schedules which are often shifted with respect to biological rhythm, and very important work load during landings and take-offs. A state of high fatigue is liable to cause phases of drowsiness and hypo-vigilance, which result in a reduction of performance and unconscious phases of micro-sleep. Micro-sleep phases can be detected in pilots during a flight, using a hypo-vigilance monitoring device, even during a critical phase such as the approach.

The phases of somnolence are attenuated thanks to speech communication or to motor activities or to a mental task. On the contrary, they are more frequent with crews composed of only two pilots, generally during the cruising phases which require only a passive surveillance (progressive occurrence of monotony), and/or during the post-prandial period and/or during times favourising drowsiness, i.e. between 11 h00 pm and 1 h00 am and between 1 h00 pm and 3 h00 pm, according to the pilot's biological clock. In addition, such phases of drowsiness sometimes occur simultaneously for both pilots.

At present, modern planes are equipped with a "timer" function, which through a diverted use, allows the crews to create an alarm which sounds at a preset time.

However, no function dedicated to one of the pilots' rest in the cockpit exists at the moment within the frame of the rules emitted by public authorities and taking into consideration the operating companies internal procedures.

Thus, there is an interest in proposing an efficient device for managing a pilot's rest period, in order to manage the phases of somnolence in order to improve on the one hand the quality of the rest and on the other hand the pilot's vigilance, whatever the flying phases, mainly during the phases requiring a particular vigilance such as the take-off and approach phases.

SUMMARY

The disclosed embodiments provide a device for managing a pilot's rest period, in flight, in the cockpit of an airplane including:

means for acquiring at least one input parameter characteristic of an event generating an end of the rest period desired by the pilot wishing to have a rest, such as a time of the end of the rest period or the desired duration of the rest period, or the coordinates of a point in the flight plan at which the pilot intends to end his or her rest period at the latest, calculation means for updating the remaining time of the rest period and or a scheduled position of the airplane along a programmed trajectory, at the end of the desired rest period, from at least one acquired input parameter and airplane parameters, means for displaying information of the updated remaining time of the rest period, and or on the scheduled position of the airplane, when the desired rest period is over.

Preferably, said parameter acquisition means and information display means are so arranged in the cockpit as to be accessible to the pilot wishing to have a rest from a flight control seat.

Advantageously, the information display means consist of at least one screen in the cockpit of the airplane, associated with graphic generation means, whereon the programmed rest period is displayed at least in a graphic form.

Advantageously, the calculation means intended for calculating the position of the airplane are shared means making calculations for other functions in the airplane.

The device for managing the pilot's rest period further consists of a seat which consists of at least a position, the so-called flying position, wherein the device for managing a pilot's rest period is inactive and at least a position, the so-called rest position, in which the device for managing a pilot's rest period may be activated, said seat being provided with a pilot's isolation device, which is capable of isolating the pilot from the sound and/or light environment in the cockpit, said isolation device including at least a first position when it is inactive and at least a second position when it is active.

In one embodiment, the isolation device is a hood arranged on an upper part of the back of the pilot's seat. Said hood is folded in the first position and partly unfolded above the pilot having a rest in the second position.

When the pilot's isolation device is activated, i.e. when the hood is unfolded, the device for managing the pilot's rest period advantageously generates, using the calculation means, at least a signal for activating a pilot's environment adaptation device in the cockpit.

The environment adaptation device consists of, for example, a system for controlling the brightness or a system for controlling the sound in a volume around the pilot having a rest.

When the device for managing a rest period is active for the pilot, said device advantageously generates a command signal for inhibiting a pilot's hypo-vigilance monitoring device, in order to prevent the systematic generation of a hypo-vigilance warning signal when said pilot is having a rest.

Advantageously, when the rest period is over or shortly before the rest period is over, the device for managing a rest period generates a command signal for activating a pilot's awakening device.

The detailed description of the disclosed embodiments is made while referring to the Figures which show:

DETAILED DESCRIPTION OF THE DRAWINGS

Figure 1:
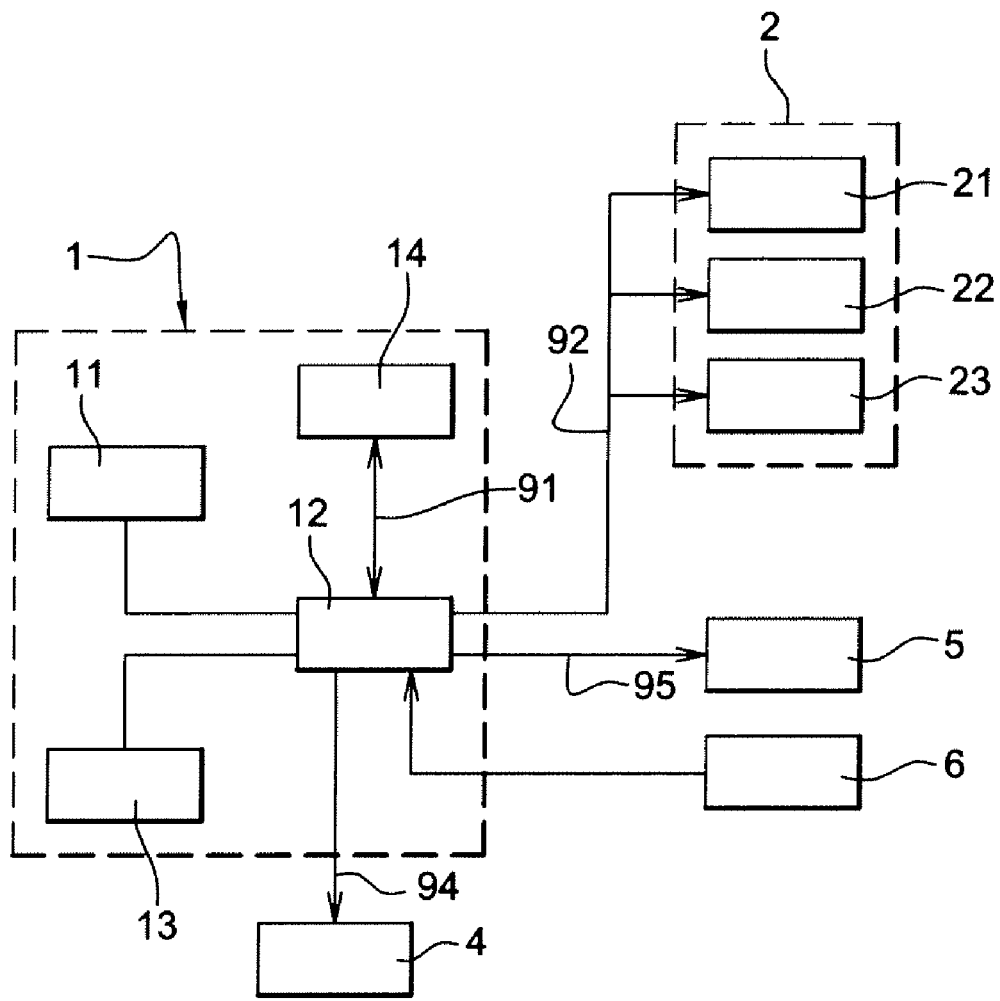
FIG. 1, a diagram of a device managing a pilot's rest period according to the disclosed embodiments, FIG. 2, an exemplary display screen of the parameters acquisition means including the input parameters entered by the pilot, FIG. 3 an exemplary alternative of the display screen of the parameters acquisition means including the input parameters entered by the pilot, FIG. 4 an exemplary display screen of the information display means including a marker indicating the time of the end of the pilot's rest, FIG. 5 an exemplary alternative of the display screen of said information display means including a countdown indicating the remaining time of the pilot's rest, FIG. 6 a side view of a seat including a hood according to the disclosed embodiments, in a reclined position.

A device 1 for managing a rest period, in flight, of a pilot in a cockpit of an airplane for example during a long-haul flight according to the disclosed embodiments consists of, as illustrated in FIG. 1:

parameters acquisition means 11 intended to acquire and record input parameters required for programming a pilot's rest period, calculations means 12 which provide a processing of the input parameters acquired by said parameters acquisition means, information display means 13 which receive data calculated by the calculation means 12 and which display the result.

The parameters acquisition means 11 are used by the pilot wishing to define a period during which he or she wants to have a rest in the cockpit. Said parameters acquisition means consists of a user's interface including at least a display screen on which a page, also called "pilot's rest page", intended for the entering and the recording of input parameters, is displayed at least temporarily. The input parameters are entered by the pilot into the pilot's rest page using a selector such as for example a keyboard. Advantageously, the display screen and the selector are means existing in the airplane, for example a screen and a keyboard of a flight management system (FMS).

In a first embodiment, as illustrated in FIG. 2, the pilot's rest page consists of a field specific for entering a mark of a time, also called "time marker" to define a time for the end of the rest period. The time of the end of the rest period, while taking into account a transitory phase for the pilot's awakening, may substantially coincide with the beginning of a flying phase requiring a particular attention from the pilot.

In a derived embodiment as illustrated in FIG. 3, the pilot's rest page includes a field specific for entering a mark for the rest period, also called "Nap Marker", in order to define the desired duration of the rest period.

In another embodiment, not shown, the pilot displays the coordinates of a point in the flight plan for which he/she intends to end his/her rest period at the latest. The calculation means 12 calculate the time associated with such point.

In another embodiment, not shown, which does not intend to limit the disclosed embodiments, the pilot enters a percentage or a volume of consumed fuel for which he/she intends to end his/her rest period at the latest. The calculation means 12 calculate the time associated with such consumption.

The calculation means 12 consists of at least one calculator, advantageously the calculator of the airplane ensuring other functions, and able to calculate either a flight position or the time of awakening from the input parameters obtained through the parameter acquisition means 11 and airplane parameters acquisition 6.

The information display means 13 consists of, for example display means, for example on a navigation screen already existing in the cockpit, associated with graphic generation means.

According to a first embodiment, the input parameters entered, corresponding to a time, is converted by the calculation means 12 into a scheduled position for the airplane along the trajectory thereof programmed in a navigation system or while taking into consideration the automatic pilot trajectory. A mark 131 on the display screen of the information display means 13 shows said position on the programmed trajectory and preferably reproduces the time entered for the end of the pilot's rest period as illustrated in FIG. 4.

Preferably, the calculation means 12 permanently determine a remaining time $\Delta T$ before the airplane reaches a position on the trajectory which corresponds to the position of the mark 131 and generate one warning signal or warning signals whether visual signals or sound signals, to the intention of the pilot having a rest and if need be to the pilot who is still awake (both pilots are never having a rest simultaneously), when the time $\Delta T$ becomes null or reaches a limit value $\Delta t_{min}$, for example a time corresponding to a time of transition to the awakening when the rest period is over.

According to an alternative embodiment, a display on the screen of the information display means 13 such as for example a digital and/or analog countdown, indicates a duration corresponding to the remaining time $\Delta T$ of the rest period as illustrated on the example of FIG. 5.

The information display means 13 thus make it possible for another pilot in the airplane who is not having a rest to permanently have a precise indication enabling him to know the progress of the nap.

Advantageously, the information, the position at the end of the rest period on the trajectory or the nap remaining time may be reproduced on the pilot's screen when the latter is not having a rest.

Advantageously, said calculation means 12 include a regulatory and standard database determining the flight phases for which a rest is authorised and the flight phases for which the rest is prohibited. Said calculation means thus generate a warning to the attention of the pilot who would enter data which would lead to a rest period during a prohibited phase or at least temporarily overlapping a prohibited phase, and a warning message having the meaning of "rest not allowed during this flight phase" is for example displayed.

Preferably, the calculation means 12 receive generally unpredictable external events data coming from specific detectors such as for example:

a detected turbulence or the proximity of dangerous climatic conditions, a message known as ATC, a failure message from an ECAM system, a traffic alarm.

The events, if they happen during the programmed rest period, may lead to a reduction in the duration of the rest period.

In this case, the calculation means 12 recalculate the duration of the pilot's rest period.

The parameter acquisition means 11 and the information display means 13 are preferably so arranged in the cockpit as to be accessible to the pilot wishing to have a rest, from a flight control seat.

The device 1 for managing a pilot's nap further consists of a pilot's isolation device 14 connected by a linkage 91 to the calculation means 12, and positioned on the pilot's seat 143.

Said isolation device makes it possible for the pilot who wishes to have a rest to be isolated from the noise in the cockpit and from the other pilot without having to leave said cockpit.

The seat includes at least one position, also called flying position in which the device 1 for managing a pilot's rest period is inactive and at least one position, also called the rest position, in which the device 1 for managing the pilot's rest period may be activated.

In one exemplary embodiment, as illustrated in FIG. 6, the pilot's isolating device 14 is a hood 141, positioned on an upper part 142 of the back 144 of the pilot's seat 143.

When the pilot is in a flying phase, the hood 141 is substantially folded at the back of the seat 143 in a non cumbersome way, so as not to be in the pilot's way when he/she moves for example, to have access to the controls of a ceiling panel.

When the pilot wants to have a rest, the hood 141 is partly unfolded above the pilot. This unfolding may be manually carried out by the pilot himself/herself when he/she pulls said hood over him/her.

In one embodiment, when the seat 143 includes a backwards reclined position of the back 144 of the seat to reach an ergonomic rest position, the hood automatically unfolds from the back of the seat, for example using articulated or powered devices, during the reclining of the seat 144 and becomes accessible to the pilot who just has to pull it above him/her and to adjust the position thereof according to his/her need for isolation.

When the pilot finishes programming his or her rest period, the device 1 for managing a rest period activates a device 2 for adapting the environment of the pilot who has a rest, using the calculation means 12.

The calculation means 12 generate one control signal or control signals 92 to environment control systems specific to the pilot of the pilot's environment adaptation device 2 such as:
- a brightness control system 21,
- a sound control system 22,
- a temperature and ventilation control system 23.

Advantageously, said adaptation device is characterised for example by the generation of a command to the brightness control system 21 so as to reduce the brightness of the lights within the volume around the pilot having a rest.

Advantageously, said adaptation device is characterised by the generation of a command to the sound control system 22 in order to reduce or even inhibit the sound intensity of the loudspeakers in a volume around the pilot having a rest.

Preferably, means for activating the pilot's environment adaptation device 2 is the unfolding of the hood 141 by the pilot.

Advantageously, the device 1 for managing the rest period generates a command signal 95 for inhibiting a hypo-vigilance monitoring device 5, when the airplane is provided with such a monitoring device, using the calculation means 12.

Said signal results in avoiding the systematic generation of a hypo-vigilance warning signal when the pilot is having a rest, without a specific deactivation or action from the pilot. Such hypo-vigilance monitoring device 5 is automatically reactivated when the rest period is over, without any specific action from the pilot and without any risk that the pilot might forget to reactivate it.

Advantageously, using the calculation means 12, the device 1 for managing a pilot's rest period generates a command signal 94 for activating a pilot's awakening device 4, when his or her rest period is over or just before the end of the rest period. During the rest period, the pilot becomes totally unaware of the situation. A phase of transition relating to rules emitted by the authority during which the pilot becomes aware of the information relating to the airplane and to the flight is required. The pilot's awakening device 4 thus provides the pilot with a procedure helping him/her to recover his/her vigilance, using an interface.

Thus, when the pilot wants to have a rest, he or she first programs his or her rest period using the device 1 for managing a pilot's rest period. Preferably, the hood is then unfolded, for example manually by the pilot, which automatically activates the pilot's environment adaptation device 2 which reduces the brightness and the sound within the corresponding area in the cockpit. The activation of the device 1 for managing the pilot's rest period deactivates the hypo-vigilance monitoring device 5 for the pilot having a rest, but remains active for the pilot controlling the flight. When the rest is over, the pilot is informed by a sound signal and the awakening device 4 is activated.

In an alternative embodiment, when the pilot unfolds the hood without having programmed a rest, during a flight phase for which a rest is prohibited, the calculation means generate a warning to the attention of the pilot who unfolds the hood and a warning message having a signification of "rest not allowed during this flying phase—fold the hood" is for example displayed.

The device for managing a pilot's rest period according to the disclosed embodiments thus makes it possible to improve the quality of the pilot's rest and the pilot's vigilance while complying with the operational rules as regard rest within the cockpit.

The invention claimed is:

1. A device for managing a rest period, in flight, of a pilot in a cockpit of an airplane, wherein it includes:
   means for acquiring at least one input parameter characteristic of an event generating the end of a rest period desired by the pilot wishing to have a rest,
   calculation means for updating the remaining time of the rest period and or a scheduled position of the airplane along a programmed trajectory, at the end of the desired rest period, from at least one acquired input parameter and airplane parameters,
   means for displaying information on the updated remaining time of the rest period and or on the scheduled position of the airplane, when the desired rest period is over,
   said parameter acquisition means and information display means being so arranged in the cockpit as to be accessible to the pilot wishing to have a rest from a flight control seat, and
   wherein said device is inactive for at least a position, so-called flying position, of a seat on which the pilot is seated and is configured to be activated for at least one position, so-called rest position, of said seat, said seat being provided with a pilot's isolation device, capable of isolating the pilot from the sound and or light environment in the cockpit, said isolation device consisting of at least a first position when it is inactive and at least a second position when it is active.

2. A device according to claim 1, wherein the information display means consist of at least a screen in the cockpit of the airplane, associated with graphic generation means, whereon the updated remaining time of the rest period and/or the scheduled position of the airplane, when the desired rest period is over, is displayed at least in a graphic form.

3. A device according to claim 1, wherein the calculation means are shared means making the calculations for other functions in the airplane.

4. A device according to claim 1, wherein the isolation device is a hood arranged on an upper part of a back of the pilot's seat, and folded in the first position and partly unfolded above the pilot having a rest in the second position.

5. A device according to claim 1, generating at least one signal for activating a pilot's environment adaptation device in the cockpit, when the pilot's isolation device is activated.

6. A device according to claim 5, wherein the environment adaptation device includes a system for controlling the brightness in a volume around the pilot having a rest.

7. A device according to claim 5, wherein the environment adaptation device includes a sound control system in a volume around the pilot having a rest.

8. A device according to claim 1, generating a command signal for inhibiting a pilot's hypo-vigilance monitoring device when the device for managing a pilot's rest period is active for said pilot.

9. A device according to claim 1, generating a command signal for activating a pilot's awakening device when the rest period is over or shortly before the rest period is over, said awakening device providing a procedure intended to help the pilot to recover all his or her vigilance.

* * * * *